Aug. 9, 1927.
C. H. BUSCH ET AL
1,638,561
LEG CONSTRUCTION
Filed May 11, 1923
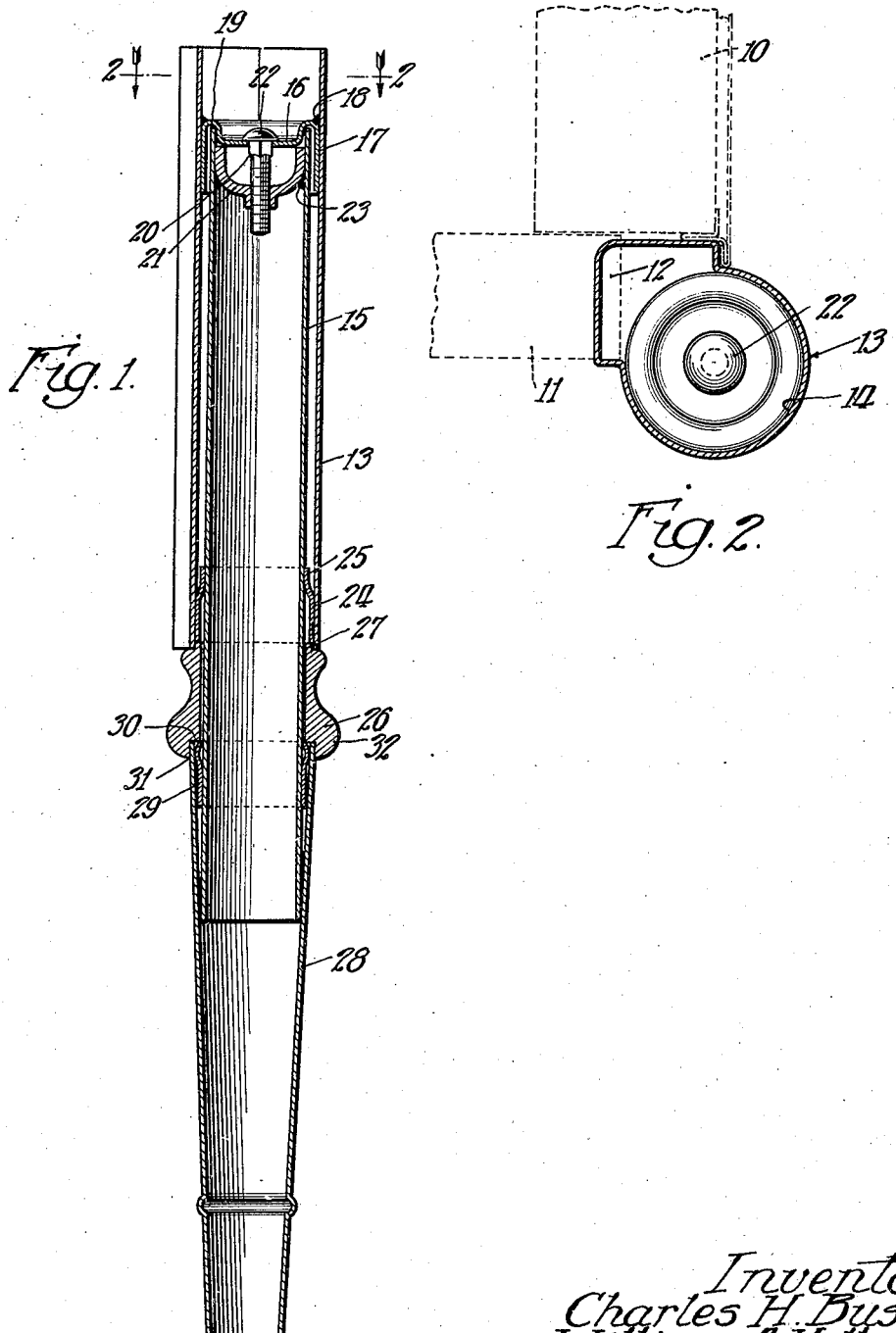
Inventors:
Charles H. Busch.
William A. Vollmer.
Fisher Towle Clapp + Soans Attys Patented Aug. 9, 1927.

1,638,561

UNITED STATES PATENT OFFICE.

CHARLES H. BUSCH AND WILLIAM A. VOLLMER, OF KENOSHA, WISCONSIN, ASSIGNORS TO SIMMONS COMPANY, OF KENOSHA, WISCONSIN, A CORPORATION OF DELAWARE.

LEG CONSTRUCTION.

Application filed May 11, 1923. Serial No. 638,235.

Our invention relates to improvements in leg constructions and has particular reference to a construction of a detachable leg suitable for metal furniture.

The principal objects of the invention are to provide in metal or other furniture a construction whereby a leg may be detached or removed, thereby conserving space in shipping and minimizing danger of injury or breakage during handling, storage or shipment; to provide a construction which requires the use of no tools or other equipment for demounting or assembly; to provide a construction which shall be extremely rigid, rugged, sightly and economical to manufacture; and in general to provide an improved leg construction of the character referred to.

In the drawings which illustrate our improved leg construction as applied to an article of metal furniture such as a lady's dressing table, Fig. 1 is a vertical section through the post and leg of said table, and Fig. 2 is a section taken on the line 2—2 of Fig. 1.

In the drawings, the parts shown in dotted lines at 10 and 11 are intended to represent the side and front framing members of the dressing table, said parts being suitably secured to the angular portion 12 of the post 13. Said post 13 is made with a circular portion 14 which extends from top to bottom of the dressing table body or case and serves as a sheath into which the upper circular tubular extension 15 of the leg is telescopically inserted and secured.

As shown in the figures, the upper telescopic extension 15 of the leg is of considerably less diameter externally than the interior diameter of the circular portion 14 of the tubular post 13. In order to center part 15 in the post, we secure in the upper end of the post portion 14 a ferrule or cup shaped member 16 the outer flange 17 of said ferrule 16 fitting the interior of the post portion 14, and being rigidly united thereto as by brazing at one or more points as indicated at 18. The central portion of the ferrule 16 is depressed as shown, so as to form an annular inverted pocket 19 adapted to receive the upper end of said telescopic leg part 15, the extremity of the latter being arranged to abut against the bottom of the annular seat 19. The seat 19 is preferably formed so as to center the upper end of the leg part 15 as well as to constitute an abutment therefor. The leg is held in the post by means of cooperating threaded members which in the present instance comprise a depending screw 20 extending downwardly through an aperture punched in the center of the ferrule 16, and a cup shaped nut member 21 fitting within the upper portion of the inner leg part 15. The screw 20 is prevented from being displaced by brazing the head 22 thereof or otherwise securing same to the metal of ferrule 16. The cup shaped nut part 21 is similarly secured into the tube 15 by brazing as at 23.

The lower portion of the telescopic leg part 15 is centered in the bottom of the post portion 14 by securing in the latter in any manner as by brazing, a short sleeve part 24 the lower portion of which snugly fits within the post portion 14 while the upper portion 25 is reduced in diameter by spinning or otherwise to fit rather snugly around the outside of the telescopic leg portion 15, it being understood that the snugness of said fit does not prevent the telescopic leg portion from being inserted through said sleeve part 24 or being rotated therein.

Below the lower end of the post portion 14 we prefer to secure a mounting or framing member 26, which, in the present instance is shown as an ornamental annular casting, it being understood, however that said casting may be made of other material such as sheet metal with equal results. Said mounting 26 is centrally apertured to freely admit the telescopic leg portion 15 and is preferably provided with a short reduced neck portion 27 fitting within the lower end of the post portion 14 thereby centering and positioning said mounting. Preferably, the mounting is permanently united to the lower end of said post portion 14 as by brazing.

In order to satisfy the artistic requirements in the present instance, the leg proper is made tapering as indicated at 28, the tapering portion 28 being, for convenience in manufacture, constructed of a separate length of tubing swaged or otherwise formed to the required taper. The telescopic leg portion 15 is extended downwardly a sufficient distance until its external diameter fits the internal diameter of the tubular tapered leg portion 28, and is secured therein in any desired manner, for instance by brazing or welding. Also, in order to preserve the coaxial alignment of the tapered leg portion 28 and the telescopic leg portion 15, we prefer to insert a filling sleeve 29 into the annular crevice between said parts, said filler sleeve 29 being suitably formed to fit snugly the exterior diameter of the parallel tube part 15 and the interior diameter of the tapered leg part 28. Said filler part 29 may be rigidly united to either or both of said parts by brazing so that there results a tubular leg having a lower tapering portion terminating in a shoulder 30, the portion above said shoulder being parallel or of uniform diameter.

In order to conceal the shoulder or offset 30, we prefer to form an annular recess in the bottom end of the post mount 26, said recess being made large enough freely to admit the shoulder part 30 of the leg. It will be observed that the break or parting line between the post and the removable lug occurs at the point 31 which is concealed by the swell 32 of the post mount 26 so that if the paint or other finish at that point is damaged or marred by the removal or insertion of the post, the appearance of the leg is not affected.

In view of the above description, it will be manifest that with this construction the leg may be removed from the post at any time by merely twisting the lower end of the leg so as to unscrew the threaded connection between the parts 20 and 21 upon which, leg 28 can be pulled freely out of the post. When reassembling the leg, the telescopic portion of the leg 15 is slid upwardly into the post and the leg is then rotated to engage nut 21 with screw 20.

The described details of construction being illustrative of merely one phase of our invention, the scope of same should be determined by reference to the appended claims, said claims being construed as broadly as possible, consistent with the state of the art.

We claim as our invention:

1. In an article of furniture, the combination of a frame, a tubular corner post integrally united to said frame, an annular ornamental trimming secured on the lower end of said corner post and apertured coaxially with said post, a leg having an upper parallel portion insertable through said trimming upwardly into said post and having a tapered portion into which the lower end of said parallel portion is secured at a point intermediate of the length of said tapered portion, said tapered portion terminating in an external shoulder above said point and threaded parts respectively provided in the post and on the upper end of said parallel portion and engageable by rotation of the leg in the post, said trimming being formed to conceal said shoulder.

2. In an article of furniture, the combination of a frame having a hollow post, a tubular leg having a portion thereof adapted to freely telescope within said post, means for centering said portion in said post and comprising a ferrule disposed within the post at a distance from the lower end thereof and secured thereto, said ferrule having a centrally disposed portion projecting downwardly and adapted to receive the inner end of the leg snugly thereover and means for centering said portion adjacent the lower end of said post.

3. In an article of furniture, the combination of a frame having a hollow post, a tubular leg having a portion thereof adapted to freely telescope within said post, means for centering and seating said portion in said post and comprising a ferrule disposed within the post at a distance from the lower end thereof and secured thereto, said ferrule having a centrally disposed portion projecting downwardly and adapted to receive the inner end of the leg snugly thereover and a seat against which the end of said portion is adapted to abut, and means for centering said portion adjacent the lower end of said post.

4. In an article of furniture, the combination of a frame having a hollow post, a tubular leg having a portion thereof adapted to freely telescope within said post, means for centering and seating said portion in said post and comprising a ferrule disposed within the post at a distance from the lower end thereof and secured thereto, said ferrule having a centrally disposed portion projecting downwardly and adapted to receive the inner end of the leg snugly thereover and a seat against which the end of said portion is adapted to abut, means for centering said portion adjacent the lower end of said post, and means for retaining said leg so centered and seated comprising a pair of screw members respectively on said ferrule and said leg and adapted to be interengaged by rotation of the leg.

5. In an article of furniture, the combination of a frame having a hollow post, a tubular leg having a portion thereof adapted to freely telescope within said post, means for centering and seating said portion in said post and comprising a ferrule disposed within the post at a distance from the lower end thereof and secured thereto, said ferrule having a centrally disposed portion projecting downwardly and adapted to receive the inner end of the leg snugly thereover and a seat against which the end of said portion is adapted to abut, means for centering said portion adjacent the lower end of said post, and means for retaining said leg so centered and seated comprising a screw member secured to said ferrule and depending therefrom substantially axially of the post, a nut member within said leg and secured thereto adjacent the upper end thereof, said nut member having a recess in the upper face thereof adapted to guide the bolt to the threaded aperture of the nut so as to facilitate interengagement therebetween.

6. In an article of furniture, the combination of a frame having a hollow post member, a tubular leg comprising a bottom portion and a shank and having an annular shoulder defining said bottom portion and shank, said shank being adapted to freely telescope within said post, means for centering said shank within said post, means for retaining said shank so centered and a trimming member disposed between the lower end of said post and said shoulder and having seats on opposite ends thereof adapted to respectively receive the bottom of the post and the shoulder on the leg so as to effect a concealed joint between the leg and the post.

CHARLES H. BUSCH.
WILLIAM A. VOLLMER.